United States Patent
Keldrauk

[15] 3,679,334
[45] July 25, 1972

[54] FLUID POWER UNIT

[72] Inventor: Walter Keldrauk, 21500 Lassen St. 0149, Chatsworth, Calif. 91311

[22] Filed: Aug. 21, 1970

[21] Appl. No.: 65,836

[52] U.S. Cl..............................418/142, 418/170, 180/43 B, 180/66 F
[51] Int. Cl..........................................F03c 3/00, B60k 3/00
[58] Field of Search..................418/142, 164, 165, 166, 167, 418/170, 171, 168, 169, 181; 180/66 F, 43 B

[56] References Cited

UNITED STATES PATENTS

| | | | |
|---|---|---|---|
| 2,430,528 | 11/1947 | Moon | 180/66 F |
| 3,391,753 | 7/1968 | Anderson | 180/43 B |
| 2,811,140 | 10/1957 | Nubling | 418/171 |
| 1,408,839 | 3/1922 | Sparrow | 418/170 |
| 3,157,350 | 11/1964 | Fraser | 418/171 |

FOREIGN PATENTS OR APPLICATIONS

| | | | |
|---|---|---|---|
| 64,297 | 6/1955 | France | 418/171 |

*Primary Examiner*—William L. Freeh
*Assistant Examiner*—John J. Vrablik
*Attorney*—Nilsson, Robbins, Wills & Berliner

[57] ABSTRACT

A rotary, fixed displacement fluid motor or pump. In a particular embodiment, an axially short, compact fluid power unit is provided utilizing roller bearings integrally disposed in angular contact between the annular bearing surfaces of a central rotor and axially juxtaposed side plates. The rotating rim of the central rotor is exposed and designed to accept a tire tim on its periphery and to replace and fit within the space used by the conventional wheel hub and brake assembly of a vehicle. Alternatively, a pulley rim can be superannularly disposed on the central rotor rim. In another embodiment, the power unit components are encased in a housing and power is transmitted via a rotating shaft journaled in extensions through the housing.

11 Claims, 8 Drawing Figures

PATENTED JUL 25 1972 3,679,334

INVENTOR.
WALTER KELDRAUK
BY
NILSSON, ROBBINS, WILLS & BERLINER
~ATTORNEYS~

INVENTOR.
WALTER KELDRAUK
BY
NILSSON, ROBBINS, WILLS & BERLINER
~ATTORNEYS~

INVENTOR.
WALTER KELDRAUK
BY
NILSSON, ROBBINS, DALGARN & BERLINER
~ATTORNEYS~

FLUID POWER UNIT

FIELD OF THE INVENTION

The fields of art to which the invention pertains include the field of pumps, particularly of the rotary expansible chamber type having interengaging impellers, and the field of motor vehicles of the driven-steering-wheel type, particularly utilizing fluid pressure motors.

BACKGROUND AND SUMMARY OF THE INVENTION

The term "hydraeric" as used herein intended to be generic to fluid under pressure and includes both hydraulics and pneumatics.

A wide variety of fluid pressure motors and pumps have been available which operate by the rotation of interengaging impellers or gears; see for example, U.S. Pat. Nos. 2,107,152, 2,753,810 and 3,291,060. Similar principles have been used to construct rotary motors such as in U.S. Pat. No. 1,408,684 disclosing a percussion tool. It has also been known to utilize rotary motors of such construction to drive the wheels of a vehicle or the like, as exemplified by U.S. Pat. Nos. 665,497, 1,666,598, 3,280,934 and 3,391,753. Particularly with respect to this latter utilization, the rotary motors of prior construction have generally been of complex, bulky design involving a great number of moving parts.

The present invention is directed toward a rotary motor or pump which is of relatively simple design and which utilizes, other than bearings, only two moving components. An hydraeric power unit is provided which can be employed as a fluid motor in either stationary or vehicular equipment or as a constant displacement fluid pump. In one embodiment, roller bearings are integrally disposed in angular contact between the annular bearing surfaces of a central rotor and axially juxtaposed side plates. This bearing arrangement makes possible an axially short, compact, fixed displacement fluid motor ideally suited for use as a powered terrain wheel hub. Very large diameter, integral bearings can be used which are also ideally suited to carry the excessive bearing load and punishment in the hub of vehicular equipment.

The power unit utilizes rotors formed with eccentrically meshed gear teeth in the form of tangent arc internal and external cam lobes which provide smooth fluid flow and permit close tolerance grinding of the mating surfaces during manufacturing. Ports are symmetrically defined through the side plates to direct hydraeric fluid into and out of continuously varying compartments defined by the interengaging rotor lobes. Porting symmetry permits unrestricted operation in either direction of rotation, allowing the use of identical fluid power hubs in all wheels of a vehicle. A dynamic pressure sealing technique is utilized which greatly extends the service life of the seals involved. A seal molded of a flurocarbon is dynamically pressed against the confronting polished surfaces of the side plates by means of centrifugally displaced bearing lubricating fluid.

The inherent versatility and capabilities of the power unit can be utilized to provide either a fluid motor or a fluid pump, thus providing parts commonality, interchangeability and compatibility for simplified design, installation, servicing and replacement of components in a complete hydraeric system. Employed as fluid pumps in a hydraeric circuit, these units may be used singly or in groups or gangs of two or more units, and they may be shunted into or out of a circuit as needed to control or vary torque or velocity output of the interconnected fluid motor. Thus, the power units provided herein can be utilized not only as fluid motors, but also as constant displacement fluid pumps in either stationary or vehicular equipment, the large diameter bearings being capable of absorbing a sustained, heavy input of external power transmitted through a chain, belt or gear drive.

The present design is sufficiently flexible so that it may be readily altered dimensionally to achieve desired torque range, speed range, size and mounting arrangement, for miniature to massive units. The motors operate in any position and environmental conditions, and will even operate under water. The use of a minimum of moving parts, simplicity of construction, oversized bearings and low friction materials for dynamic seals, lead to long life with minimum component replacement and maximum reliability.

With respect to vehicular use, the power units replace and fit within the space used by the front wheel hubs and brake assemblies of automobiles, trucks, motorcycles, tractors, earthmovers, etc. They also replace the rear wheel hubs, brakes, axles, shafts, differential gears, ring and pinion gears, housings, drive shafts and universal joints of the same vehicles. The power unit provides a direct rotative force to each wheel of a vehicle allowing all wheel drives with independent wheel suspension to be a natural configuration for these vehicles. The power unit also serves as a brake when fluid flow is restricted, allowing the elimination of conventional brakes and their associated problems of unbalance, fading, water failure, and periodic relining. Heat of braking friction is dissipated remotely and simply through an oil cooling radiator.

The very broad speed ratio changes available in a hydraeric circuit make these units usable with a diesel power plant, gas turbine plant or any power source which operates best at a more constant R.P.M., thereby allowing a meaningful reduction in air pollution. Furthermore, the precise metering, positive response, accurate motion control and complete, instantaneous selectivity features of hydraeric circuitry make practical and feasible non-skid braking, power delegation to gripping wheels, power steering and other control, manipulation and safety features. A central power source and pump or multiple pumps coupled with valves and hydraeric lines to the hydraeric power hubs can be used to provide the propulsive circuit. Other rotary or linear motion or power requirements such as power steering, power jacks, windows, winches, etc., can be readily added anywhere in any vehicle and tied in to the hydraeric circuit.

Vehicle hydraeric circuits may range from very simple to ultra sophisticated. The equipment may be single purpose such as a trencher or multi-purpose such as a truck with removable attachments to perform numerous functions. Front and rear wheels synchronized steering is readily achieved by using identical power units and independent wheel suspension systems on the front and rear wheels, and then cross-coupling fluid lines to slave and master steering cylinders between the front and rear steering assemblies. By such means, maximum maneuverability is provided for farm tractors, earthmovers, skip loaders, graders, forklifts, off-road trucks, recreation vehicles, and the like.

In addition to vehicular use, the power units can be used in industrial equipment, such as ditchers, logging equipment, mining equipment, oil well drilling equipment, and farm machinery, as well as in aircraft, helicopters, marine vessels, machine tools, telescopes and radar installations.

DETAILED DESCRIPTION

As required, detailed illustrative embodiments of the invention are disclosed herein. However, it is to be understood that these embodiments merely exemplify the invention which may take many forms radically different from the specific illustrative embodiments disclosed. Therefore, specific structural and functional details are not to be interpreted as limiting, but merely as a basis for the claims which define the scope of the invention.

Figure 1:
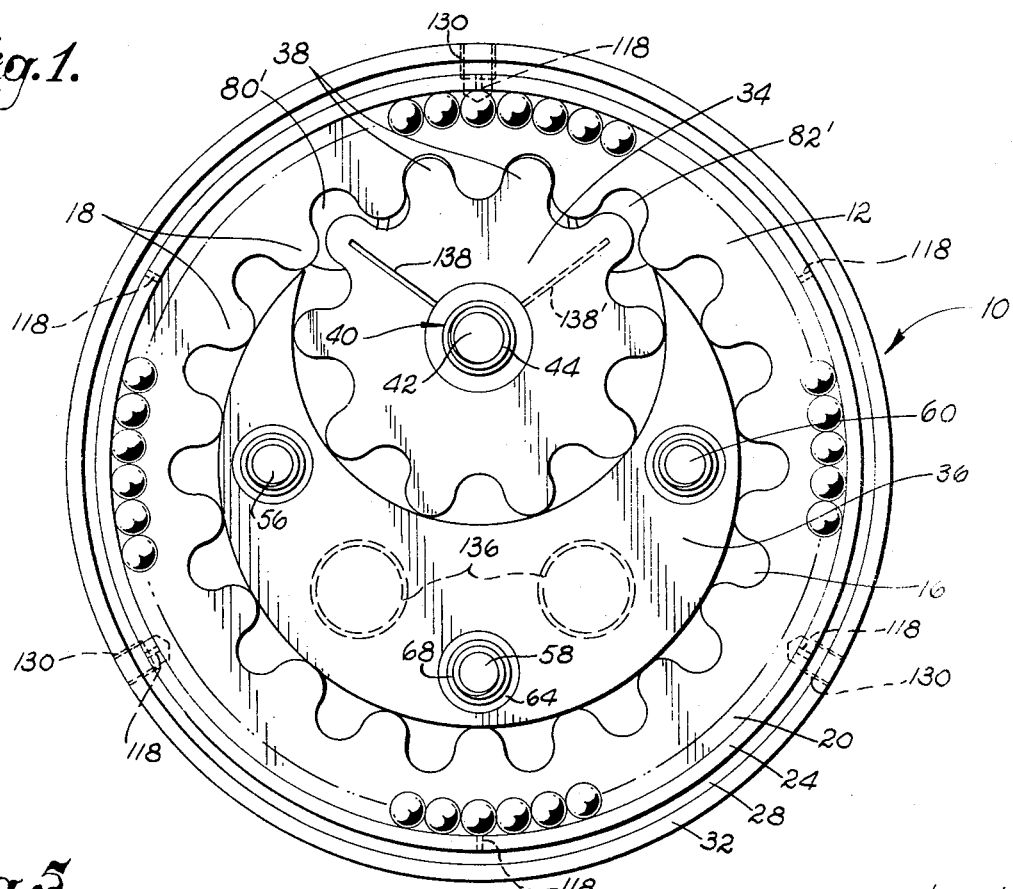
FIG. 1 is an elevational view of the internal components of a rotary fluid motor, taken on line 1—1 of FIG. 2, in the direction of the arrows.
Figure 2:
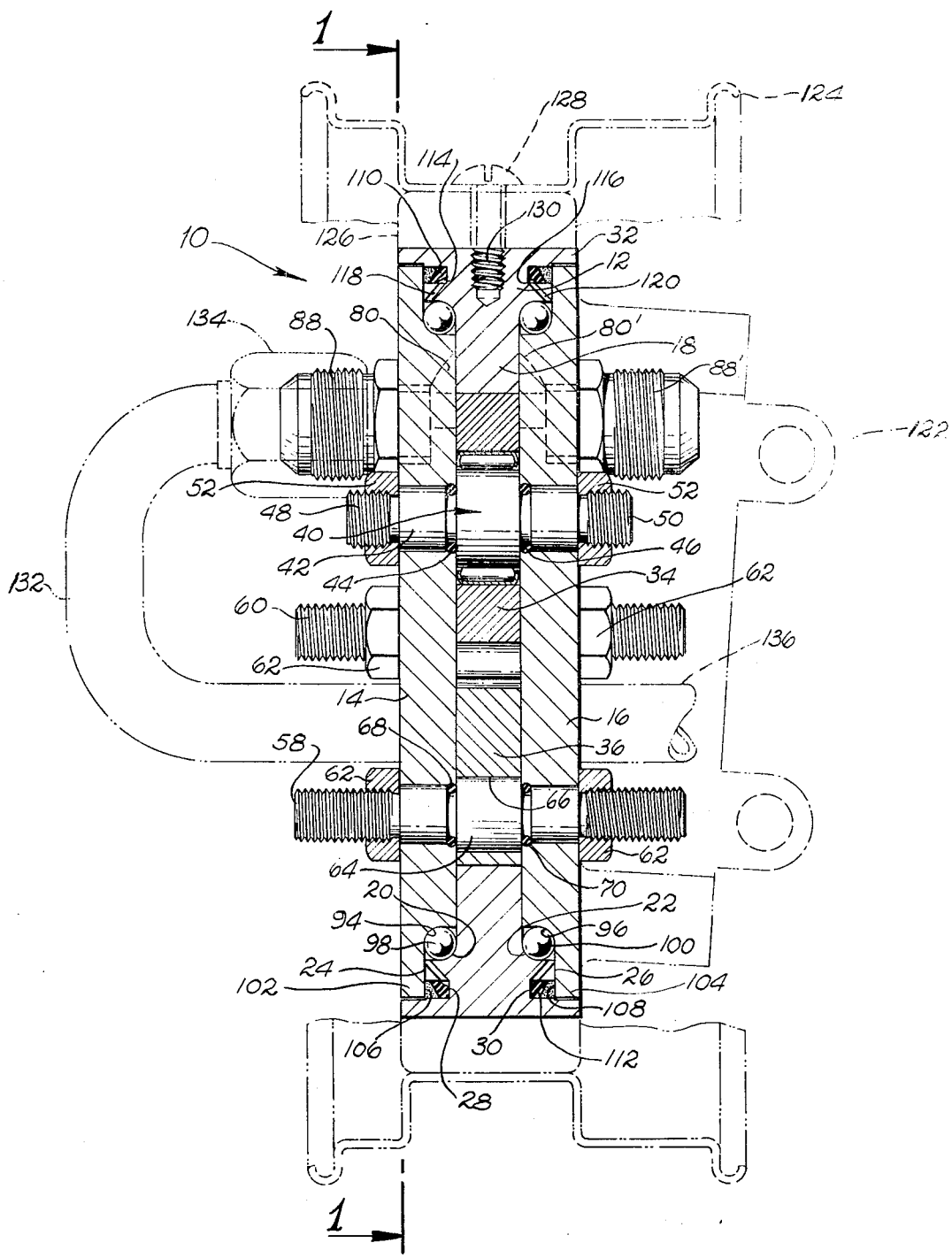
FIG. 2 is a cross-sectional view of a rotary motor in accordance with the present invention.

Referring now to FIGS. 1 and 2, there is illustrated an hydraeric motor 10 which replaces and fits within the space used by a wheel hub and brake assembly of an automobile, motorcycle, or the like. The motor 10 is shown in full in side cross-section in FIG. 2 and includes a central rotor 12 and a pair of side bearing plates 14 and 16 which are axially juxtaposed on opposite sides of the central rotor 12. FIG. 1 depicts the motor 10 in elevational view without the side bearing plates 14 and various fittings so as to more clearly illustrate the disposition and operative relationship of component parts of the motor 10.

Viewing both FIGS. 1 and 2 together, it is seen that the central rotor 12 constitutes a main body of the motor 10 and is circularly formed with inwardly directed gear teeth in the form of internal cam lobes 18. Angular contacts bearing surfaces 20 and 22 are annularly formed on opposite axial sides of the rotor 12 by the extension thereat of peripheral shoulders 24 and 26, each bearing surface 20 and 22 constituting one-half of a ball bearing race. O-ring seal grooves 28 and 30 are formed through each shoulder 24 and 26 radially outwardly of the bearing surfaces 20 and 22, as will be referred to hereinafter in more detail. A peripheral flange 32 defines the outer annular bounds of the central rotor 12.

The side bearing plates 14 and 16 constitute stationary members for the motor 10 and support an idler rotor 34 and stationary crescent-shaped member 36. The idler rotor 34 is formed with outwardly directed gear teeth in the form of external cam lobes 38 and is disposed with its rotational axis spaced from the rotational axis of the central rotor 12 so that its cam lobes 38 are eccentrically meshed in tangent arc contact with the internal cam lobes 18 of the central rotor 12. The idler rotor 34 is rotatably supported on a needle bearing 40 carried by a shaft 42 which extends through the side bearing plates 14 and 16. The shaft 42 carries a pair of static O-ring pressure seals 44 and 46 on opposite sides of the needle bearing 40 and is formed with threaded ends 48 and 50 secured by nuts 52 to the side bearing plates 14 and 16.

The crescent-shaped member 36 is carried within the central rotor 12 beneath the idler rotor 34 and is supported on shafts 56, 58 and 60 which extend through the side bearing plates 14 and 16 and are threaded on their opposite ends and secured by nuts 62 to the side bearing plates 14 and 16. Referring to the shaft 58 as representative of the other shafts 56 and 60, as shown in detail in FIG. 2, the shaft 58 is formed centrally with an increased diameter portion 64 which is press-fit into an opening 66 formed through the crescent-shaped member 36. A pair of static O-ring pressure seals 68 and 70 are carried on opposite sides of the increased diameter portion 64.

Figure 4:
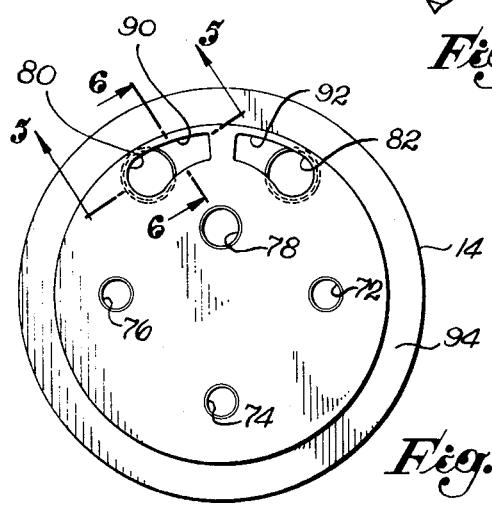
FIG. 4 is an elevational view of a side plate which is shown in cross-section in FIG. 2.

Referring now to FIG. 4, the side bearing plate 14 is formed with a plurality of openings 72, 74 and 76 through which extend the crescent-shaped member support shafts 56, 58 and 60 respectively. An opening 78 is formed on centerline, but spaced from the axial center of the plate to accommodate the idler rotor shaft 42. Additionally, there are also formed two hydraeric fluid ports 80 and 82 which symmetrically communicate with the meshing cam lobes 18 and 38 of the central rotor 12 and idler rotor 34 respectively. The disposition of the hydraeric fluid ports can be seen with reference to FIG. 1 where there is illustrated the ports 80' and 82' correspondingly formed through the opposite side bearing plate 16. Each side bearing plate 14 and 16 is formed identically so that there is symmetry not only on both sides of centerline, but also on opposite sides of the central rotor 12.

Figure 5:
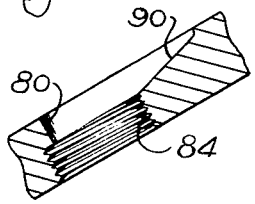
FIG. 5 is a cross-sectional view on line 5—5 of FIG. 4, in the direction of the arrows.
Figure 6:
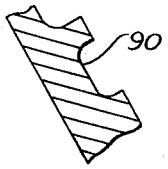
FIG. 6 is a cross-sectional view on line 6—6 of FIG. 4, in the direction of the arrows.
Figure 3:
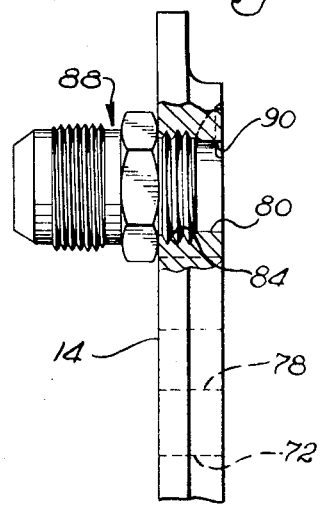
FIG. 3 is a partially elevational, partially cross-sectional view of a portion of a side plate which is shown in cross-section in FIG. 2.

Details of the manner of construction of the hydraeric fluid ports 80 and 82 can be seen with reference to FIGS. 3, 5 and 6 illustrating the fluid port 80 as exemplary. An opening is formed through the side plate 14 to define the port 80 and is threaded at 84 to receive the screw-threaded end 86 of a tube fitting 88. The internal surface of the side plate 14 is cut away to define progressively shallow pockets 90 and 92 curved toward each other in extension from the ports 80 and 82.

Referring to FIGS. 2 and 4, the internal peripheral surface of the side plates 14 and 16 are cut away to form annular angular contact bearing surfaces 94 and 96 confronting the corresponding angular contact bearing surfaces 20 and 22 on opposite sides of the central rotor 12. The confronting bearing surfaces 20, 94, 22, 96 thus define a pair of bearing races in which sets of ball bearings 98 and 100 are disposed in angular contact, as will be hereinafter referred to in more detail.

The peripheral edges 102 and 104 of the side bearing plates 14 and 16 extend radially outwardly of the ball bearings 98 and 100 to serve as a bearing surfaces for O-ring seals 106 and 108 disposed in the central rotor seal grooves 28 and 30. The O-ring seals 106 and 108 are of truncated triangular cross-section and are molded of a relatively rigid flurocarbon, such as Teflon, or polyethylene compound possessing very low friction coefficients. The seals 106 and 108 are slidably pressed against the polished surfaces of the side plate peripheral edges 102 and 104 by means of specially constructed rubber O-rings 110 and 112 which are of angular cross-sectional shape to match the inner surface of the seals 106 and 108, but which are cut away adjacent the inner corner of the grooves 28 and 30 as at 114 and 116. The rubber O-rings 110 and 112 are sufficiently resilient to provide initial static force against the seals 106 and 108 when the side bearing plates 14 and 16 and central rotor 12 are assembled. The initial static force may be assisted by a suitable metal spring or wave washer, if required for a particular application. Importantly, the cutaway portions 114 and 116, provide access to the seal grooves 28 and 30 so that, by means of a plurality of fluid passage holes 118 and 120 formed through the peripheral shoulders 24 and 26, lubricating fluid is conducted from the ball bearings 98 and 100, by centrifugal force, into the seal grooves 28 and 30. The disposition of six fluid passage holes 118 is shown in shadow in FIG. 1. By such means, the rubber O-rings 110 and 112 are pressed against the low friction seals 106 and 108 which, in turn, are pressed against the internal side plate peripheral edges 102 and 104. This construction allows non-stretch seals 106 and 108 to be utilized, which seals can be made of harder, tougher, longer lasting material. The construction also allows the ball bearings 98 and 100 to be immersed in hydraulic fluid for lubrication and cleaning action through filtering. Furthermore, since the seals 106 and 108 move axially sideways (not radially expanded), against the side bearing plates mating surfaces 102 and 104, wear is taken up by the same axial movement of the seals 106 and 108 and this wear does not adversely effect the performance or function of the seals 106 and 108 until they are worn quite thin, yielding an extremely long seal life.

Referring back to FIG. 1, in this particular embodiment, the central rotor 12 is formed with 18 inwardly directed cam lobes 18 and the idler rotor 34 is formed with 10 outwardly directed cam lobes 38 of mating configuration to the central rotor cam lobes 18. With the idler rotor 34 axially off-set or eccentric with respect to the central rotor 12, certain of the cam lobes of the two rotors are in full engagement whereby upon rotation of the rotors, a constant but slow gain in revolutions occurs between the two rotors, the central rotor 12 rotating at an annular speed less than that of the idler rotor 34, in proportion to the number of cam lobes of the respective rotors.

At all times during operation of the motor 10, cam lobes of the two rotors are intermeshed, thus defining a plurality of separate compartments. As a result of the eccentric relationship of the two rotors, each such compartment is of continuously varying dimensions. The side bearing plates 14 and 16 are disposed against the sides of the axially opposite sides of the rotors 12 and 34 so that these compartments are each sealed against the exterior. Accordingly, when an hydraeric fluid is introduced through a suitable port, such as the port 80, to a compartment, while at the same time, the port 82 adjacent a spaced compartment is in an open condition, the force of the hydraeric fluid will rotate the cam lobes into tangent arc engagement, in the direction of the port 82. The resultant rotation of the rotors 12 and 34 carries the hydraeric fluid to the port 82 where it is conveyed to an outlet line. Referring both to FIGS. 1 and 2, it will be seen that inlet ports 80 and 80' are provided on opposite sides of the central rotor 12 as are the outlet ports 82 and 82'. However, it will be clear that in a modification of the present structure, the inlet and outlet ports 80' and 82' of one of the side plates 16 can be omitted, power being obtained by means of the introduction of fluid through the inlet port 80 and out of the outlet port 82.

As indicated by the dashed lines at 122 in FIG. 2 a steering and independent wheel suspension joint 122 can be provided secured through one of the side bearing plates 16 so that the side bearing plates 14 and 16 are stationary members. As a result of the present construction wherein the side bearing plates 14 and 16 are formed parallel to the opposite sides of the central rotor 12, access to the rotational movement of the central rotor 12 can be obtained. This is effected by means of the central rotor peripheral flange 32 which over rides the peripheral edges of the side bearing plates 14 and 16. Accordingly, with the side bearing plates 14 and 16 stationarily secured, the direction of hydraeric fluid into the inlet port 80 and out of the outlet port 82 results in rotational movement of the peripheral rotor flange 32.

A vehicle tire rim and wheel as indicated by the dashed line at 124, can be attached directly to the central rotor flange 32, a spacer or adapter ring as indicated by the dashed lines 126 being utilized when appropriate. The tire rim 124 is secured by means of machine screws such, as shown by the dashed lines at 122, threaded into a plurality of openings 130, spaced peripherally about the central rotor flange 32, as shown in shadow in FIG. 1. The motor 10 as hereinabove described replaces and fits within the space used by an automobile hub and brake assembly.

Hydraeric fluid is ported into and out of the motor simultaneously on both sides thereof and this construction is particularly well suited to the use of the motor 10 to drive a motorcycle wheel where access to both sides of the wheel is readily obtained. Applying fluid to both sides of the motor provides the shortest possible fluid paths into and out of the motor, reducing fluid velocity and increasing the maximum rotational speed of the motor. However, when utilized in an automobile, access to both sides of the motor 10 is not as convenient. In such cases, means can be provided for carrying hydraeric fluid through the side bearing plates 14 and 16 to the opposite side of the wheel so that hydraeric fluid can be applied from one side of the wheel only. Any of a variety of manifolds and conducting tubes can be utilized, and for illustrative purposes a particular type of conduit is shown in FIG. 2 wherein a U-shaped tube, shown in dashed lines at 132 is connected via a coupling 134 to a tube fitting 88 on one side bearing plate 14. The U-shaped tube is led through openings formed through the side bearing plates 14 and 16 as indicated by the dashed line 136 in FIG. 1, and seals are applied as appropriate. A portion 136 of the U-shaped tube 132 which extends through the side bearing plates 14 and 16 can then be connected to the source of hydraeric fluid which connects through the fitting 88' on that side of the motor 10.

Referring to further features of operation of the motor 10, it will be clear that the symmetrical design utilized in the present construction permits operation with either clockwise or counterclockwise rotation, allowing the fluid motor 10 to be utilized as a brake when the rotational direction is changed simply by changing the direction of flow of the hydraeric fluid. The porting symmetry also allows use of identical fluid power motors 10 on all wheels of the vehicle.

When utilizing hydraeric fluid to drive the rotors 12 and 34, a portion of the hydraulic fluid can be utilized to lubricate the components. Referring to FIG. 1, it will be seen that fluid flow grooves 138 and 138,' (the latter in dashed lines) are formed on opposite sides of the idler rotor 34 leading from the inlet port 80 and to the outlet port 82'. By such means hydraulic oil is conducted from the dimensionally varying compartments formed by the interengaging cam lobes 18 and 38 to the idler rotor needle bearing 40 and from there back out to the outlet port 82'. As a result of centrifugal force from rotation of the rotors 12 and 34, oil is also carried between the outer surfaces thereof and the inner surfaces of the side bearing plates 14 and 16 to the ball bearing faces whereupon the ball bearings 98 and 100 are lubricated. The oil is thereafter carried outwardly through the fluid passage holes 118 to exert outward pressure on the rubber O-rings 110 and 112, as hereinbefore indicated.

An important feature of the present construction relates to the arrangement of central rotor and side plate bearing surfaces for the angular contact disposition of the ball bearings 98 and 100. The present construction allows the use of very large diameter, integral ball bearings which in angular contact disposition are ideally suited to carry the excessive radial and thrust bearing loads and punishment encountered in the hub of vehicular equipment.

Figure 7:
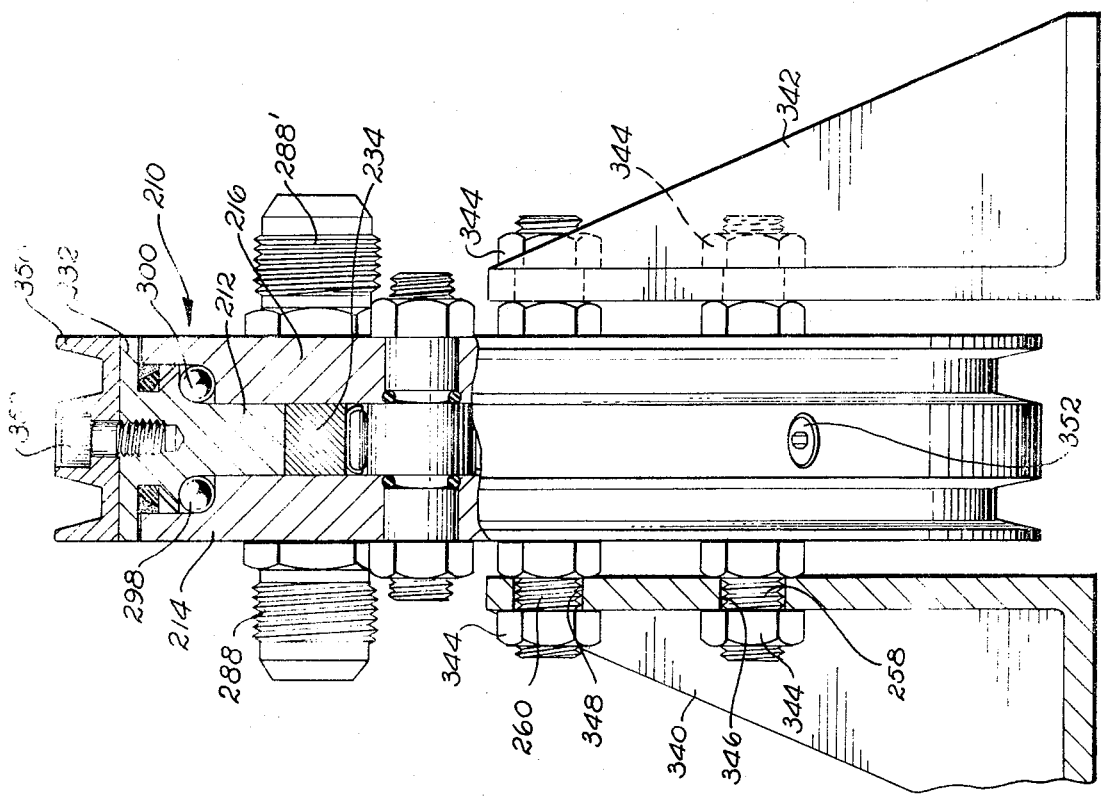
FIG. 7 is a partially elevational, partially cross-sectional view of a rotary pump embodiment of this invention.

Referring now to FIG. 7, there is illustrated another embodiment of the present invention wherein the power unit is utilized as a stationary motor 210. The motor 210 is constructed in almost identical fashion to the motor 10 as described with respect to FIGS. 1–6. Accordingly, a central rotor 212 is sandwiched between side bearing plates 214 and 216 to direct hydraeric fluid into the varying dimension compartments formed by the intermeshing engagement of the cam lobes of the idler rotor 234 with the cam lobes of the central rotor 212, all as above described. However, in the present construction, the side plates are stationarily secured to a pair of oppositely disposed angle brackets 340 and 342 by means of shafts such as illustrated at 258 and 260 secured by nuts 344 through openings 346 and 348 in the side walls of the angle brackets 340 and 342. In place of the tire rim 124 and adaptor 126, a drive pulley rim 350 is superannularly secured by threaded recessed machine screws 352 to the rotatable central rotator peripheral flange 232. By such construction, the motor 210 can be utilized to directly drive a pulley belt.

Instead of utilizing the construction as depicted in FIG. 7 as a motor it may also be utilized as a pump by applying a driving force to the pulley rim 350 whereby to conduct fluid from the inlet port to the outlet port. This can be accomplished without any change in the present structure, but by simply applying force to the pulley rim 350 to rotate the central rotor 212. When hydraeric fluid is introduced through a suitable port, such as corresponds to the port 80 of FIG. 4, into a compartment which has momentarily approximated its greatest dimensions, then in subsequent phases of any particular revolution of the central rotor 212 and idler rotor 234, the fluid is conveyed to the outlet port whereupon it is discharged.

Figure 8:
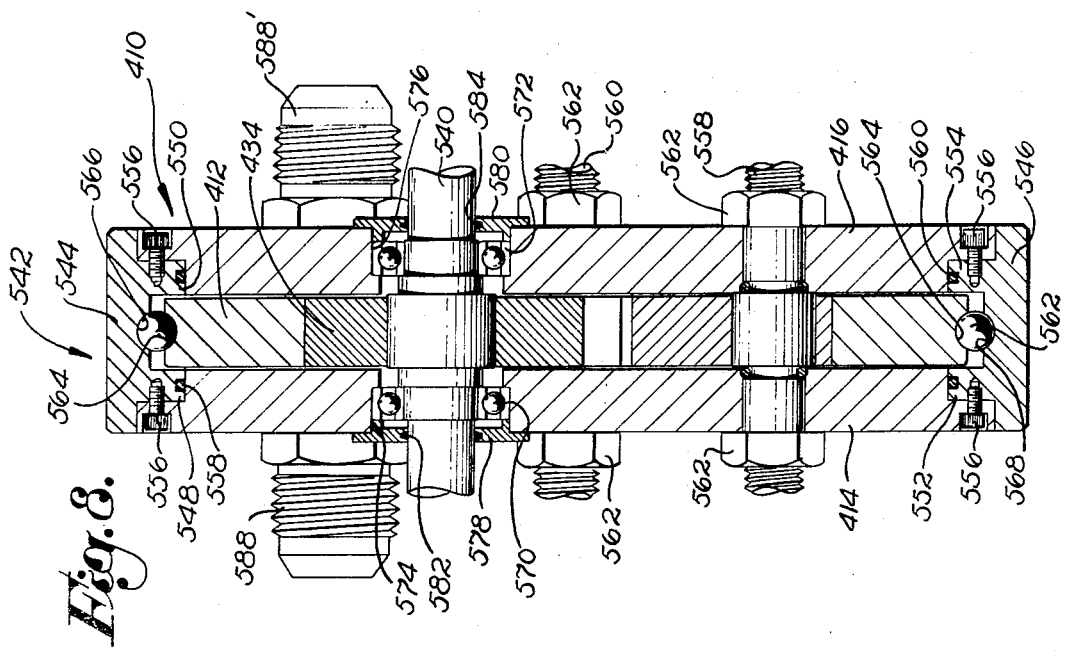
FIG. 8 is a cross-sectional view of a stationary motor embodiment of this invention.

Referring now to FIG. 8, there is illustrated still another alternative embodiment of the present invention, whereupon power is taken from or applied to the power unit 410 by means of a shaft 540 connected to what would otherwise be the idler rotor 434, but which in this embodiment constitutes a driven or driving rotor. The embodiment of FIG. 8 utilizes a pair of axially juxtaposed side plates 414 and 416 which do not serve to provide a bearing surface for the central rotor 412, but rather constitute side portions of a housing generally indicated at 542. The housing 542 includes a semi-circular top member 544 and semi-circular bottom member 546 (joined together at engaging portions in and out of the cross-sectional view shown in FIG. 8). The semi-circular members 544 and 546 are formed with downwardly depending shoulders 548, 550, and 552, 554 which enclose the outer peripheral edges of the central rotor 412 and which are secured to the peripheral edges of the side plates 414 and 416 by means of machine screws 556. O-ring seals 558 and 560 are disposed between confronting surfaces of the top and bottom members 544 and 546 and the side plates 414 and 416.

In this embodiment, a single set of ball bearings 562 are carried superannularly on the outer rim of the central rotor 412 within a bearing race formed by the confronting bearings surface of a groove 564 formed along the outer surface of the central rotor 412 and grooves 566 and 568 formed on the inner surfaces of the top and bottom semi-circular members 544 and 546 respectively.

The central rotor 412 constitutes an outer rotor which is in intermeshed engagement with an inner rotor 434, corresponding to the idler rotor of the power units of FIGS. 1-7, but which in the present embodiment is a driver or driven rotor. Whereas in the prior embodiments, the inner rotor was carried on needle bearings, the present inner rotor 434 is formed with a central shaft 540 which extends through the inner rotor 434 as an integral part thereof so as to rotate with the inner rotor 434. The inner rotor 434 is thus supported by the shaft 540, the opposite ends of which are journaled through ball bearings 570 and 572 carried in openings 574 and 576 respectively of the side plates 414 and 416. Sealing plugs 578 and 580 are disposed on opposite ends of the shaft 540 press-fitted to the side plate openings 574 and 576 respectively and carry internally disposed O-ring seals 582 and 584 to prevent leakage of lubricating hydraulic fluid.

Disposition of the other components of the motor 410 are all in accordance with analogous components as found in structures depicted in FIGS. 1-7. Accordingly, a crescent-shaped member 536 is secured by bolts, such as 558 and 560 and nuts 562 to the side plates 414 and 416, and tube fittings 558 and 588' (and another pair not shown in this cross-section) for the conduction of fluid into and out of the power unit 410.

In contrast to the previous embodiments as depicted in FIGS. 1-7, communication with the rotational movement of the rotors 412 and 434 is obtained by means of the rotor shaft 540 which is rotatably journaled in the extension through the side plates 414 and 416 of the housing 542. When utilized as a motor, hydraeric fluid is applied through appropriate ports in a manner as previously described, whereupon the rotors 412 and 434 rotate, resulting in rotation of the shaft 540. The shaft 540 can be utilized directly as a power input shaft to other machinery or its outer rim can be fitted with a "V" pulley, gear or sprocket. On the other hand, if it is desired to utilize the power unit of FIG. 8 as a pump, power can be applied to rotate the shaft 540 which would effect a movement of hydraeric fluid from the input port to the output port of the power unit 410, all in accordance with principles referred to hereinbefore.

I claim:

1. A fluid power unit comprising:
an integral annular rotor member formed with annular inwardly directed teeth, a superannular rim an annular side surface extending radially outwardly from said teeth and continuing as an annular bearing surface directed laterally outwardly of the remainder of said rotor side surface;
a stationary member axially adjacent said rotor, formed with at least one fluid port therethrough and having an annular side surface in juxtaposition with said rotor side surface and continuing radially outwardly as an annular bearing surface directed laterally outwardly of said rotor member side surface, said stationary member bearing surface confronting said rotor bearing surface, said stationary member side surface continuing radially outwardly to enclose said rotor bearing surface and formed to allow access to the rim of said rotor:
bearings disposed in angular contact between said rotor member and stationary member bearing surfaces; and
means for displacing fluid in conjunction with rotary movement of said rotor comprising a second rotor formed with annular outwardly directed teeth in eccentric meshing relation with the inwardly directed teeth of said first mentioned rotor.

2. The invention according to claim 1 in which said bearings are ball bearings.

3. The invention according to claim 1 in which said stationary member is formed with inlet and outlet ports for said fluid.

4. The invention according to claim 1 in which the rotational axis of said second rotor is spaced from the rotational axis of said first mentioned rotor.

5. The invention according to claim 1 including an annular sealing member on said rotor radially outwardly of said rotor bearing surface and means for urging said sealing member into slidable contact with said stationary member.

6. The invention according to claim 1 including a tire superannularly secured to said rotor rim.

7. The invention according to claim 1 including a pulley rim superannularly secured to said rotor rim.

8. The invention according to claim 1 including an axially central shaft rotatably journaled in extension through said stationary member whereby to provide external communication with the rotational movement of said rotors.

9. The invention according to claim 1 in which a pair of said stationary members are axially juxtaposed on opposite sides of said rotor, said rotor is formed on each axial side with said annular bearing surfaces in confrontation with respective stationary member bearing surfaces, and said stationary members are formed with symmetrically positioned inlet and outlet fluid ports therethrough.

10. The invention according to claim 1 in which a pair of said stationary members are axially juxtaposed on opposite sides of said rotor, said rotor is formed on each axial side with said annular bearing surfaces in confrontation with respective stationary member bearing surfaces.

11. The invention according to claim 2 in which a fluid inlet port is formed through one of said pair of stationary members and a fluid outlet port is formed through the other of said stationary members.

* * * * *